March 5, 1940.  M. A. MICHAELS  2,192,578
CONTROL FOR LAWN SPRINKLERS
Filed July 26, 1938
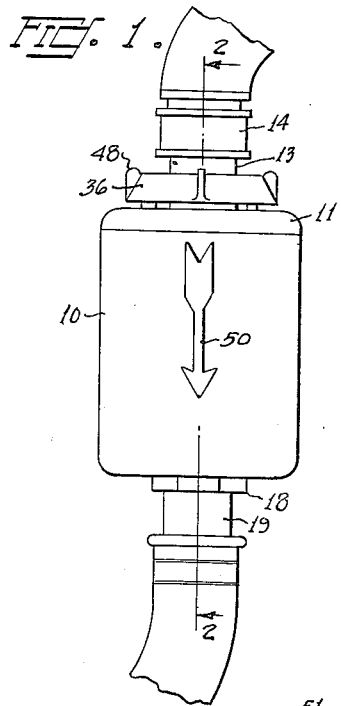
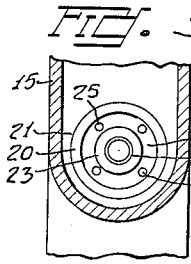
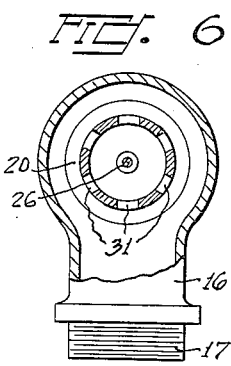
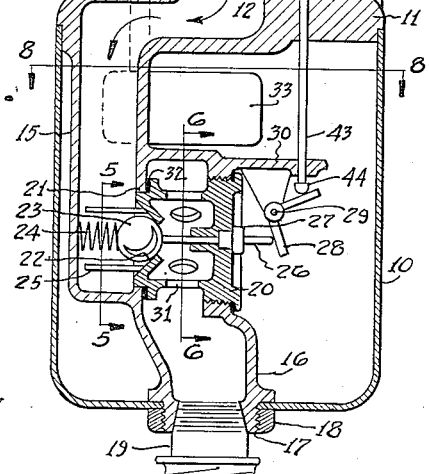
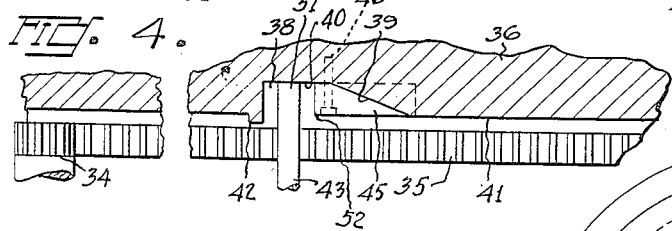
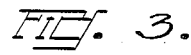
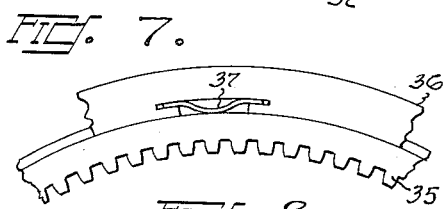
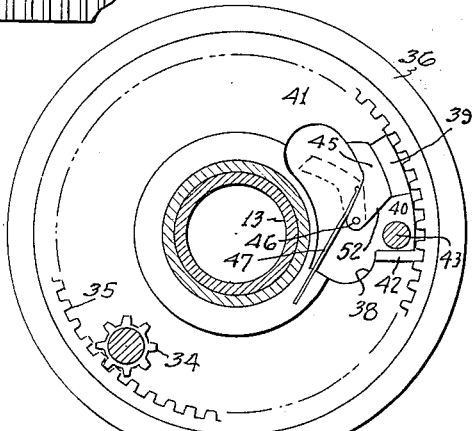
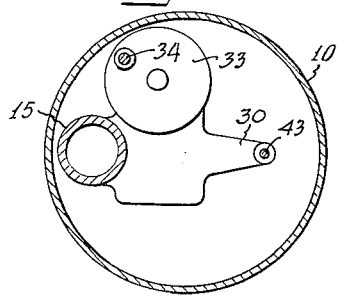
INVENTOR
M. A. MICHAELS
BY
ATTORNEY Patented Mar. 5, 1940

2,192,578

UNITED STATES PATENT OFFICE 2,192,578

CONTROL FOR LAWN SPRINKLERS

Maurice A. Michaels, Portland, Oreg.

Application July 26, 1938, Serial No. 221,351

1 Claim. (Cl. 161—7)

This invention relates generally to sprinkling systems for lawns, and particularly to a control system therefor.

The main object of this invention is the provision of a control for water valves on lawn sprinkling systems whereby a period of operation may be definitely timed and wherein the water may be turned on manually and automatically shut off after a predetermined period of flow.

The second object is to construct a device of this kind which will be easy to manufacture, small in size and adaptable for use with overground or underground sprinkler systems.

The third object is to construct a device of the class described wherein the timing of the period of operation may be varied at will either before or after the flow of water commences.

I accomplish these and other objects in the manner set forth in the following specification as illustrated in the accompanying drawing in which:

Fig. 1 is a side elevation of the device showing same applied to an ordinary hydrant faucet.

Fig. 2 is a longitudinal section through the device.

Fig. 3 is a section taken along the line 3—3 in Fig. 2.

Fig. 4 is a fragmentary section showing the operating cam and gearing.

Fig. 5 is a section taken along the line 5—5 in Fig. 2.

Fig. 6 is a section taken along the line 6—6 in Fig. 2.

Fig. 7 is a fragmentary section showing the friction device.

Fig. 8 is a section taken along the line 8—8 in Fig. 2.

Similar numerals refer to similar parts throughout the several views.

Referring in detail to the drawing, there is shown a cylindrical casing 10 having a head 11 in the center of which is formed an opening 12 into which is threaded a nipple 13 from the hose connection 14.

Formed integral with the head 11 is a tubular body 15 which is offset from the center line of the head 11 and terminates in an outlet neck 16 whose threaded end 17 is secured to the casing 10 by means of a nut 18. A hose nipple 19 is threaded into the neck 16. A valve cage 20 is threaded into the neck 16 and extends into the opening 21 within the body 15. The valve cage 20 is provided with a valve seat 22 in which is disposed a ball check 23 which is urged toward a seating position by means of the spring 24.

Guide pins 25 are provided around the ball 23 to prevent same from becoming displaced.

Projecting axially through the cage 20 is a pin 26 which is slidably mounted in the packing gland 27 and one end of the pin 26 contacts the ball 23 while the other end of the pin 26 engages the bell crank lever 28 which is mounted on the pivot pin 29 on the standard 30.

The cage 20 is provided with outlet holes 31 through which water can escape from the body 15 into the neck 16 when the ball 23 is unseated.

It is desirable to provide a packing ring 32 at the union of the cage 20 and the body 15.

Within the casing 10 is mounted a spring motor 33 whose power take-off pinion 34 meshes with the ring gear 35 which is rotatably mounted within the control disk 36. The control disk 36 is rotatable on the nipple 13. Springs 37 are mounted in the disk 36 as shown in Fig. 7 and provide the desired amount of friction between the ring gear 35 and the control disk 36. The control disk 36 has formed therein a recess 38 provided with an inclined surface 39 which extends from the bottom 40 of the recess 38 to the surface 41 of the disk 36.

A stop flange 42 is provided at the side of the recess 38 farthest from the cam surface 39. A rod 43 is slidably mounted in the head 11 and its end 44 engages the bell crank lever 28. An angular pawl 45 is pivotally mounted on the pin 46, and when in the position shown in full lines in Fig. 3, the pawl 45 lies close to the inclined surface 39 to which position it is urged by means of the spring 47. The disk 36 is provided with ears 48 which together with the pointer 49 assist in setting the disk 36 in the desired position.

It is desirable to provide an indicating arrow 50 on the exterior of the casing 10 to indicate the direction of flow.

The operation of the device is as follows:

Assuming that it is desired to sprinkle the lawn for fifteen minutes, the disk 36 is first rotated to the position shown wherein the pointer 49 will coincide with the proper ear 48.

Turning to Fig. 3 it will be noted that the rod 43 is in the path of the junction between the cam surface 39 and the pawl 45 so that when the disk 36 is rotated manually, the pawl 45 engages the rod 43 and moves the pawl or gate 45 to the position shown in dotted lines in Fig. 3 permitting the upper end of the rod 43 to ride upon the inclined cam surface 39 thereby forcing the rod 43 downwardly and by rocking the lever 28 causes the ball 23 to be unseated and permitting the water to flow to the sprinkler.

It will be noted that this manual operation of the disk 36 has caused the gear 35 to drive the pinion 34 in opposition to its spring thereby storing energy in the spring motor 33.

Since the end 51 of the rod 43 rests upon the surface 41, it follows that the motor 33 must rotate the disk 36 in the opposite direction until the end 51 can drop off of the edge 52 of the pawl 45 thereby instantly closing the valve and stopping the flow of water to the sprinkler. It also follows that no matter what the original setting is when the flow of water starts that a real adjustment can be made without altering the maximum amount of energy that can be stored within the spring motor 33.

It is a well known fact that numerous forms of valve controlling devices have been manufactured in the past. It is therefore not my desire to claim such devices broadly, but I do intend to cover all such forms and modifications thereof which fall fairly within the appended claim.

I claim:

A control for lawn sprinklers having in combination a casing having a conduit therein through which water can pass from a source of supply to a sprinkling system, a spring urged check valve in said conduit adapted to close in the direction of flow, a plunger associated with said valve adapted to unseat same, a bell crank lever operatively engaging said plunger, a cam dial adapted to operate said bell crank lever, a motor for driving said dial and a gate means associated with said cam adapted to cause sudden closure of the spring urged valve as the cam arrives at the shut-off position from a predetermined "on" position representing the desired sprinkling period.

MAURICE A. MICHAELS.